United States Patent [19]

Schmatz et al.

[11] 3,768,141

[45] Oct. 30, 1973

[54] METHOD OF SOLDERING

[75] Inventors: Duane John Schmatz, Dearborn Heights; Chia-Ming Yen, Plymouth, both of Mich.

[73] Assignee: Ford Motor Company, Dearborn, Mich.

[22] Filed: Feb. 22, 1972

[21] Appl. No.: 228,300

[52] U.S. Cl. .................................. 29/495, 29/504
[51] Int. Cl. ..................... B23k 31/02, B23k 35/36
[58] Field of Search ..................... 29/197, 504, 495; 75/166 C, 166 D

[56] References Cited
UNITED STATES PATENTS

| | | | |
|---|---|---|---|
| 2,306,667 | 12/1942 | Smith, Jr. | 75/166 C |
| 2,513,365 | 7/1950 | Rogoff | 29/197 X |
| 3,050,410 | 8/1962 | Greene | 29/197 X |
| 3,355,284 | 11/1967 | Harvey | 75/166 D |
| 3,380,821 | 4/1968 | Harvey | 75/166 D |
| 3,393,446 | 7/1968 | Hughes et al. | 29/197 X |
| 3,480,411 | 11/1969 | Pryor | 29/197 X |
| 2,781,577 | 2/1957 | Smellie | 29/495 X |
| 3,330,028 | 7/1967 | Elbreder | 29/495 |
| 3,631,588 | 1/1972 | Borozzi et al. | 29/495 X |

FOREIGN PATENTS OR APPLICATIONS

| | | | |
|---|---|---|---|
| 239,775 | 5/1969 | U.S.S.R. | 29/504 |

OTHER PUBLICATIONS

Semi–Alloys, Inc. publication, "Brazing and Soldering Alloys", Part 1, March, 1962, 4 pages, 29–504 literature.

*Primary Examiner*—J. Spencer Overholser
*Assistant Examiner*—Ronald J. Shore
*Attorney*—Keith L. Zerschling et al.

[57] ABSTRACT

This invention relates to a soft solder containing a significant portion of silver. This solder is particularly useful in soldering together components fabricated from aluminum or aluminum based metals to components based upon more noble metals and particularly to copper or copper base alloys such as ordinary brass.

8 Claims, No Drawings

METHOD OF SOLDERING

THE BACKGROUND

This invention is particularly directed to a solder for the fabrication of automotive heat exchangers wherein heat is to be abstracted from water or any of the various water base compositions employed for anti-freeze protection. An all aluminum radiator has long been sought for this purpose because of the very obvious and large savings over the conventional copper brass construction now universally employed.

The technology for the production of such all aluminum radiators is now available. The adoption of the all aluminum radiator has been prevented by the vulnerability of such radiators to the naturally alkaline waters found in much of United States and the inherent tendency of aluminum to set up a self destructive electrolytic cell when adjacent any more noble metal and connected thereto by even a weakly conducting aqueous solution.

It has been proposed that a large share of the potential savings available from the use of all aluminum radiators can be realized by retaining the present all brass water containing tubes and tanks which are virtually immune to water corrosion and are easy to repair and to use aluminum only for the fabrication of the fins where it does not contact coolant. Such a hybrid structure requires that the brass tubes be secured to the aluminum fins in a mechanically secure manner and also in a way which will permit ready transfer of heat from the tubes containing the coolant to the fins for final disposition in the air stream.

This invention is directed to a solder which will accomplish these results in a dependable and economical manner and still produce a joint relatively immune to corrosion at the joint between the aluminum fin and the much more noble brass tube.

THE INVENTION

This invention has for its object the provision of a solder particularly suitable for the soldering of aluminum or aluminum base metals to more noble metals without introducing severe corrosion problems.

A solder was developed based upon the ternary alloy system lead-tin-silver. This solder is an improvement upon the solder designated by the ASTM number B32-60T, alloy 1.5S. This earlier solder is described in detail at page 1064 of the Eighth Edition of *The American Society for Metals Handbook*. This earlier solder is described as having a composition of Lead 97.5% nominal
Tin 0.75 to 1.25%
Silver 1.3 to 1.7%
Antimony 0.40% maximum
Bismuth 0.25% maximum
Cadmium 0.08% maximum The solder described in this invention is particularly compounded to avoid corrosion problems when securing aluminum to more noble metals. The tin content of the improved solder may be as high as 10 percent. As the tin content is lowered to the vicinity of 1 percent, the solder becomes unsatisfactory because the general bulk corrosion resistance of the solder is too low to many corrosive agents particularly in the presence of aluminum. Too high a tin content is economically unattractive and introduces interfacial corrosion. An optimum range for the tin content has been found to be 3 to 5 percent.

Silver in amounts as low as 0.5 percent has been found to give beneficial results. A continuous improvement in both joint strength and interfacial corrosion resistance is obtained with increasing silver contents up to about 2.5 percent. Between 2.5 and 5 percent silver the melting point is increased to such an extent that it becomes more difficult to work and the economic disadvantages inherent in the high price of silver begin to outweigh the minor increases in both strength and corrosion resistance that are obtained. The optimum silver range has been found to be from 2 to 3 percent.

This improved solder has been found to be very intolerant of the presence of antimony. The ASTM solder described above specifically permits a maximum 0.40 percent antimony. This liberal tolerance for antimony finds its genesis in the fact that most solder is produced from secondary lead. This secondary lead in turn is largely derived from lead acid storage batteries which average about 6 percent antimony in the grids and upper lead. Residual amounts of antimony are difficult to remove from secondary lead and hence the high upper limit for antimony. In the development of the current solder it has been found that antimony must be maintained below 0.10 percent to produce a workable product. A product containing 0.25 percent antimony is quite worthless as an aluminum solder.

Conversely this solder is quite tolerant of both cadmium and bismuth. As much as two percent of either of these metals produces no adverse effects upon the utility of the solder. This is particularly advantageous because of the difficulty of removing bismuth from lead and the widespread presence of bismuth in secondary lead. The ASTM solder does not specify a bismuth tolerance directly, but does so indirectly by the final limitation of all unmentioned other impurities to the very low value of 0.08 percent.

This solder operates satisfactorily with the usual soldering fluxes and especially with the zinc chloride flux normally used for soldering operations. However, the zinc chloride or other flux must be anhydrous and is conveniently dissolved in a dry organic solvent rather than water. A concentration of 15 to 50 grams of flux in 100 cc of solvent is adequate. With this exception radiator cores using brass tubes and aluminum fins can be fabricated in the same manner as the ordinary brass tube copper fin cores. To assure equivalent heat rejection, the stock from which the aluminum fins are made is about twice as thick as with copper because of the interior heat conductivity of the aluminum. The clamped and fluxed assemblage of fins and tubes are soldered in a forced air oven at a temperature of 750°F and for a time of 150 seconds.

The mechanism by which this solder functions on aluminum and the physical macrostructure of the joint is unique and has been verified by electron microprobe data. At soldering temperatures both the zinc chloride flux and the solder are liquid. The first action of the flux is to lift or disrupt the strongly adherent film of aluminum oxide on the aluminum. The aluminum surface so cleaned reacts with the flux by a simple replacement reaction to form a layer of metallic zinc on the aluminum substrate. As the zinc continues to form, diffusion into the aluminum occurs. After the solder wets the zinc surface, silver from the solder diffuses to the interface and rapidly combines with the remaining zinc to form a silver rich zinc alloy. A solder aluminum interface is formed comprising a layer of about 75 percent silver, 25 percent zinc separating the solder, now somewhat depleted in silver from aluminum into which zinc diffusion has occured.

We claim as our invention:

1. The process of producing a soldered joint in which at least one of the components of the joint is an untreated aluminum or an aluminum base alloy and another of the components is a more noble alloy comprising applying to the joint an anhydrous flux, adding to the joint a solder based upon lead and consisting essentially of lead, from 1 to 10 percent tin, a significant amount up to 5 percent silver and not over 0.10 percent antimony, and heating the joint and solder to a temperature and for a period of time sufficient to establish a silver rich interface between the aluminum component and the solder.

2. The process recited in claim 1 in which the solder contains 3 to 5 percent tin and two to three percent silver.

3. The process recited in claim 1 in which the solder contains three percent tin and two percent silver.

4. The process recited in claim 1 in which the flux is anhydrous zinc chloride dissolved in a dry organic solvent.

5. The process of producing a heat exchange device comprising conduits normally conducting a water base coolant and an untreated aluminum or aluminum base alloy heat dissipating fins soldered to the conduits comprising fabricating the conduits from brass by soldering with a solder consisting essentially of lead, from 1 to 10 percent tin, a significant amount up to 5 percent silver and not over 0.10 percent antimony, assembling in operational relationship the soldered conduits and aluminum or aluminum base heat dissipating fins and exposing the assemblage to heat sufficiently intense and for a sufficient period of time to securely solder the fins to the tubes with said solder.

6. The process recited in claim 5 in which the solder contains 3 to 5 percent tin and two to three percent silver.

7. The process recited in claim 5 in which the solder contains 3 percent tin and 2 percent silver.

8. The process recited in claim 5 in which the flux is anhydrous zinc chloride dissolved in a dry organic solvent.

* * * * *